(12) United States Patent
Occhialini

(10) Patent No.: US 10,575,050 B2
(45) Date of Patent: Feb. 25, 2020

(54) PROVIDING A PLURALITY OF POINTS OF VIEW OF DIGITAL ENVIRONMENTS

(71) Applicant: Turner Broadcasting System, Inc., Atlanta, GA (US)

(72) Inventor: Robert Occhialini, Atlanta, GA (US)

(73) Assignee: Turner Broadcasting System, Inc., Atlanta, GA (US)

( * ) Notice: Subject to any disclaimer, the term of this patent is extended or adjusted under 35 U.S.C. 154(b) by 50 days.

(21) Appl. No.: 15/711,204

(22) Filed: Sep. 21, 2017

(65) Prior Publication Data

US 2019/0037268 A1    Jan. 31, 2019

Related U.S. Application Data

(60) Provisional application No. 62/538,021, filed on Jul. 28, 2017.

(51) Int. Cl.
*H04N 21/439* (2011.01)
*H04N 21/44* (2011.01)
(Continued)

(52) U.S. Cl.
CPC .......... *H04N 21/439* (2013.01); *A63F 13/25* (2014.09); *A63F 13/35* (2014.09); *A63F 13/52* (2014.09); *A63F 13/54* (2014.09); *H04N 21/43635* (2013.01); *H04N 21/44* (2013.01); *H04N 21/4781* (2013.01); *H04N 21/4852* (2013.01)

(58) Field of Classification Search
None
See application file for complete search history.

(56) References Cited

U.S. PATENT DOCUMENTS

2006/0271971 A1* 11/2006 Drazin ............... H04N 7/17318
                                                              725/86
2008/0163059 A1*  7/2008 Craner ............... H04N 5/44543
                                                              715/719

(Continued)

OTHER PUBLICATIONS

Evertz, "Vista Link Pro 7867VIPA12-HSN Advanced 12 Input Compact Multi-Image Display Processor (Brochure)", Undated, please see Citation 2.

(Continued)

*Primary Examiner* — Michael R Telan
(74) *Attorney, Agent, or Firm* — Alston & Bird LLP

(57) ABSTRACT

In an example embodiment, a user interface for displaying multiple points of view within a digital environment is provided. For example, a display device of a user computing entity may display a user interface. The display of the user interface may be caused by operation of an application on the user computing entity. One or more video streams corresponding to points of view within the digital environment may be received via a communications interface of the user computing entity. The one or more video streams may be processed via the application operating on the user computing entity. In response to the processing of the one or more video streams, at least one of the video streams may be displayed in a configurable position of the user interface. At least one of the video streams is a mosaic video stream comprising mosaic video data corresponding to two or more points of view within the digital environment.

18 Claims, 10 Drawing Sheets

(51) Int. Cl.
*H04N 21/4363* (2011.01)
*H04N 21/478* (2011.01)
*A63F 13/54* (2014.01)
*A63F 13/35* (2014.01)
*A63F 13/25* (2014.01)
*A63F 13/52* (2014.01)
*H04N 21/485* (2011.01)

(56) References Cited

U.S. PATENT DOCUMENTS

| | | | |
|---|---|---|---|
| 2010/0014825 A1* | 1/2010 | Curtis | G11B 27/10 386/248 |
| 2011/0107220 A1* | 5/2011 | Perlman | A63F 13/12 715/720 |
| 2011/0249177 A1* | 10/2011 | Chen | H04N 21/2347 348/388.1 |
| 2011/0302442 A1* | 12/2011 | Garrett | G06Q 20/10 713/400 |
| 2012/0284755 A1* | 11/2012 | Keret | H04N 21/2187 725/62 |
| 2014/0184898 A1* | 7/2014 | Overliese | H01R 13/62905 348/372 |
| 2015/0121437 A1* | 4/2015 | Tan | H04N 21/2187 725/93 |

OTHER PUBLICATIONS

Evertz, "2010 Annual Report, End-to-End Solutions", p. 6 mentions VIP-A technology, earliest online publication available, retrieved from <https://evertz.com/contact/investors> on Apr. 11, 2018.

* cited by examiner

PROVIDING A PLURALITY OF POINTS OF VIEW OF DIGITAL ENVIRONMENTS

CROSS-REFERENCE TO RELATED APPLICATIONS

This application claims priority to U.S. Application No. 62/538,021, filed Jul. 28, 2017, the contents of which are incorporated by reference herein in their entireties.

TECHNOLOGICAL FIELD

Embodiments of the present invention are generally related to providing a user with a plurality of points of view of one or more virtual or digital environments. For example, an example embodiment allows a point of view of each player of a multi-player video game to be displayed to a user.

BACKGROUND

Competitive electronic sports, or esports, allow players to participate in virtual or digital environments. Traditional sports competition occurs in a physical game space, such as in a football stadium or in a basketball arena. Thus, in traditional sports competition, multiple points of view of the game play may be provided to viewers by placing cameras at different positions within the physical space. However, with esports, as the competition occurs in a virtual or digital environment, providing viewers with multiple views of the competition action is not as simple as placing multiple cameras within a physical space. Therefore, providing a viewer with multiple points of view of the competition action comprises providing the viewer with multiple video streams, each from a different point of view. This method of providing a viewer with multiple points of view of the competition action may require a significant amount of bandwidth and processing resources. For example, if the multiple points of view include more than, for example, four points of view, the viewer may not have access to sufficient bandwidth to view the multiple points of view. And as will be recognized, an esports competition may comprise two teams of five players competing within a virtual or digital environment and a viewer may wish to watch the competition action from the view point of each of the players. This would require the viewer to have access to sufficient bandwidth for viewing ten different video streams.

Therefore, a need exists for improved methods, apparatus, systems, computer program products, computing devices, computing entities, and/or the like for providing a viewer with multiple viewpoints of an event occurring in a virtual or digital environment that does not require an excessive amount of bandwidth.

BRIEF SUMMARY

In general, embodiments of the present invention provide methods, apparatus, systems, computer program products, computing devices, computing entities, and/or the like for providing a viewer with a user interface through which a user may view a plurality of points of view of virtual or digital environments. For example, a single video stream comprising a plurality of points of view of the virtual or digital environment may be provided to a viewer via a user interface. In one embodiment, if the virtual or digital environment is an esports competition, the single video stream may comprise a points of view of each player of a team in the esports competition. In another example in which the virtual or digital environment is an esports competition, the user interface may be configured to provide the user with a point of view of each player in the esports competition.

According to one aspect of the present invention, a system is provided. In an example embodiment, the system comprises one or more game servers, the one or more game servers generating a digital environment; a plurality of stream processing systems, each stream processing system configured to process an audio and/or video stream captured from a corresponding point of view within the digital environment; a multiviewer; and a streaming server. The multiviewer is configured to receive a plurality of audio and/or video streams processed by the plurality of stream processing systems, each of the plurality of audio and/or video streams captured at a corresponding point of view within the digital environment, combine the plurality of audio and/or video streams into a single combined audio and/or video stream corresponding to a plurality of points of view within the digital environment, and provide the combined audio and/or video stream to the streaming server for streaming to at least one user computing entity.

According to another aspect of the present invention, a method is provided. In an example embodiment, the method comprises generating a digital environment using one or more game servers; processing a plurality of audio and video streams captured from corresponding points of view within the digital environment via a plurality of stream processing systems, receiving the plurality of audio and/or video streams processed by the plurality of stream processing systems by a multiviewer, combining the plurality of audio and/or video streams into a mosaic and/or combined audio and/or video stream, providing the mosaic and/or combined audio and/or video stream to a streaming server configured to stream the mosaic and/or combined audio and/or video stream to one or more user computing entities.

According to still another aspect of the present invention, a method for providing a user interface for displaying multiple points of view within a digital environment is provided. In an example embodiment, the method comprises displaying the user interface via a display device of a user computing entity comprising at least one processor, a communications interface, and the display device, the displaying of the user interface caused by operation of an application on the user computing entity; receiving one or more video streams via the communications interface of the user computing entity; processing the one or more video streams using the application operating on the user computing entity; and responsive to the processing of the one or more video streams, causing at least one of the video streams to be displayed via the user interface. At least one of the video streams is a mosaic video stream comprising mosaic video data corresponding to two or more points of view within the digital environment.

According to another aspect of the present invention, an apparatus is provided. In an example embodiment, the apparatus comprises at least one processor, at least one memory storing computer program code, and at least one user interface. The at least one memory and the computer program code configured to, with the processor, cause the apparatus to at least display the user interface via the display device; receiving one or more video streams via a communications interface of a user computing entity, the user computing entity comprising at least one processor, the communications interface, and a display device; process the one or more video streams using an application operating on the user computing entity; and in response to the processing of the one or more video streams, cause at least one of the video streams to be displayed via the user interface. At least one of the video streams is a mosaic video stream comprising mosaic video data corresponding to two or more points of view within a digital environment.

According to yet another aspect of the present invention, a computer program product is provided. In an example embodiment, the computer program product comprising at least one non-transitory computer-readable storage medium having computer-executable program code instructions stored therein. The computer-executable program code instructions comprises program code instructions configured to display the user interface via the display device; receive one or more video streams via a communications interface of a user computing entity, the user computing entity comprising at least one processor, the communications interface, and a display device; process the one or more video streams using an application operating on the user computing entity; and responsive to the processing of the one or more video streams, cause at least one of the video streams to be displayed via the user interface. At least one of the video streams is a mosaic video stream comprising mosaic video data corresponding to two or more points of view within a digital environment.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 5:
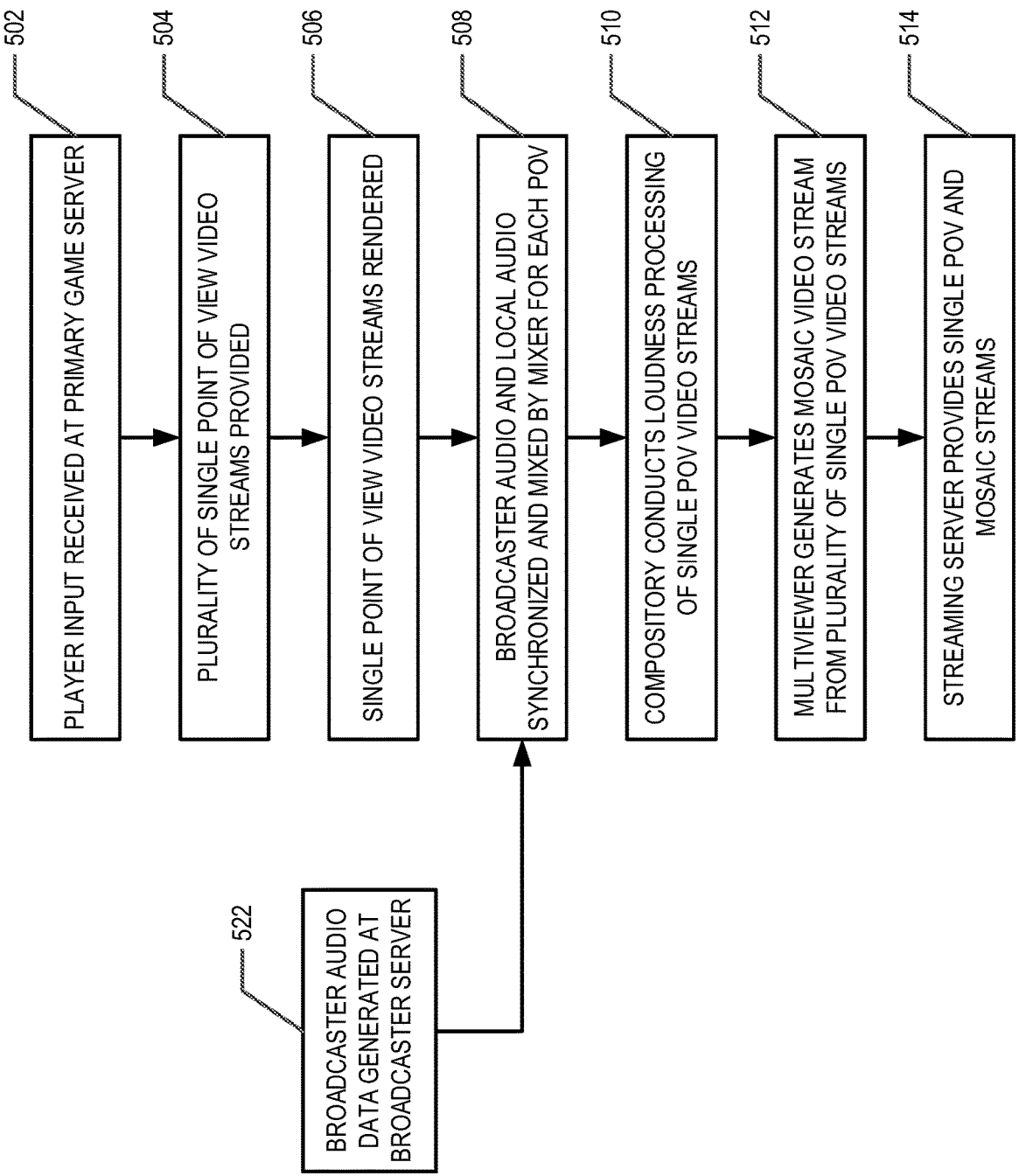
Figure 6:
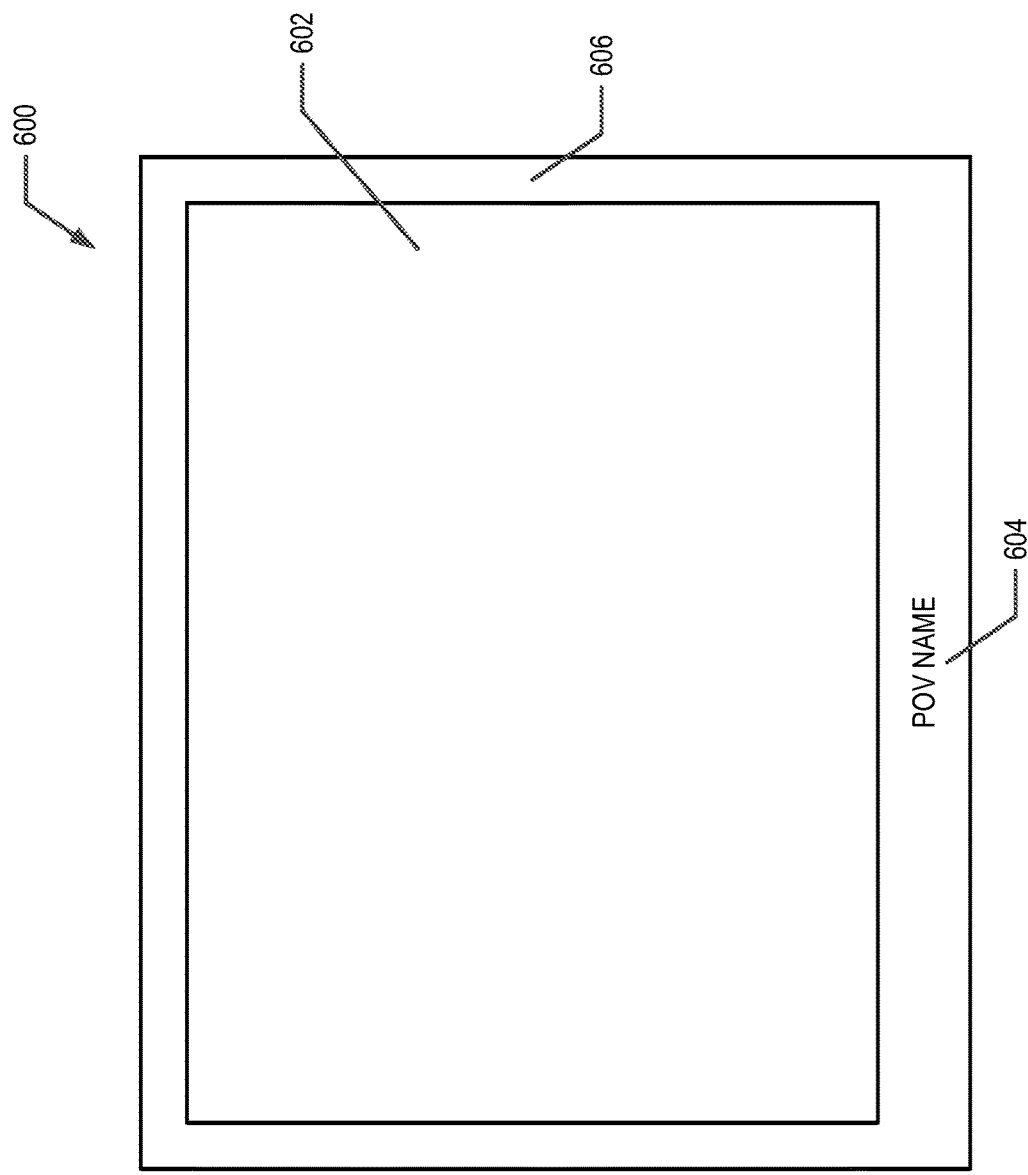
Figure 7:
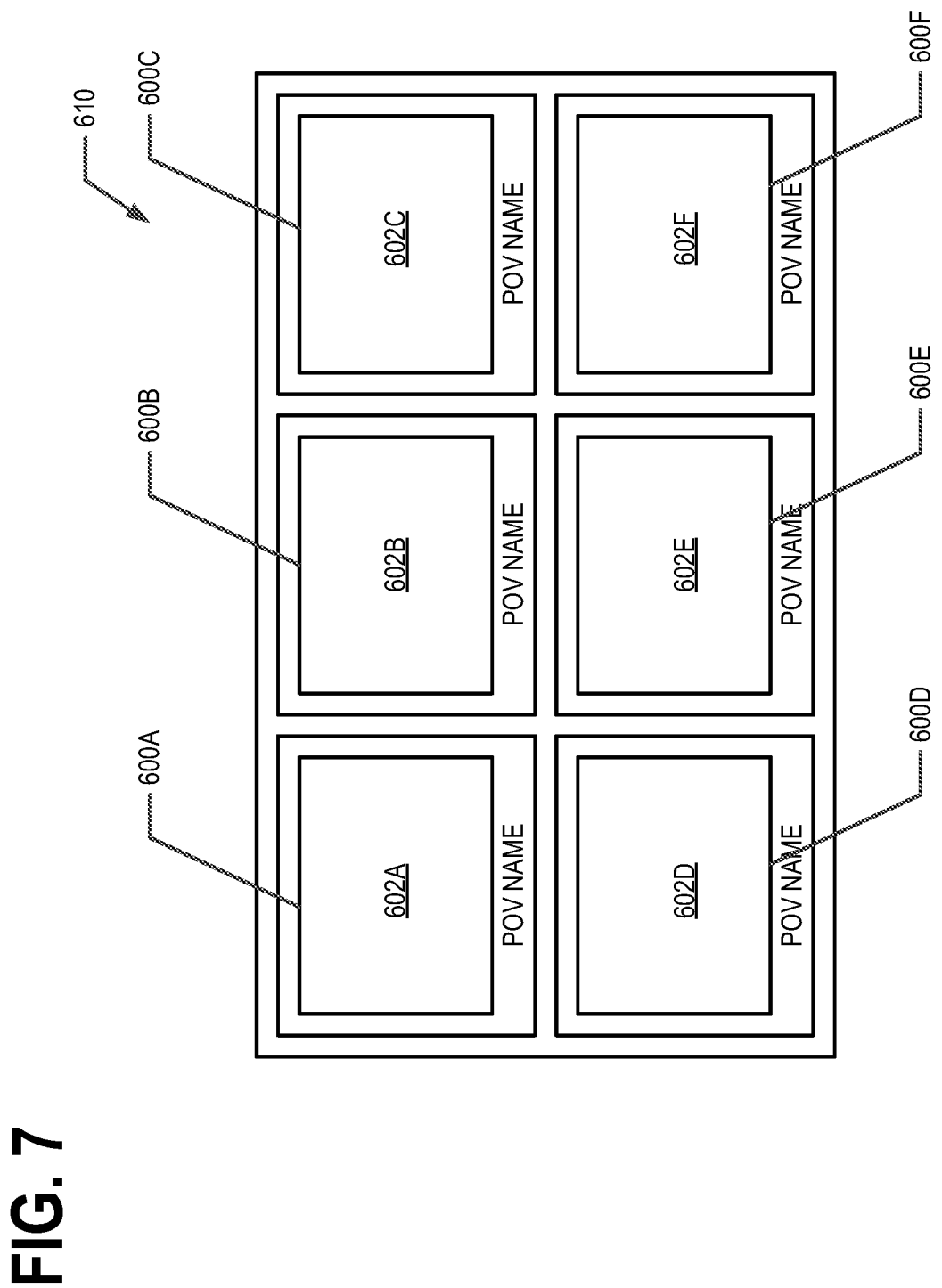
Figure 8:
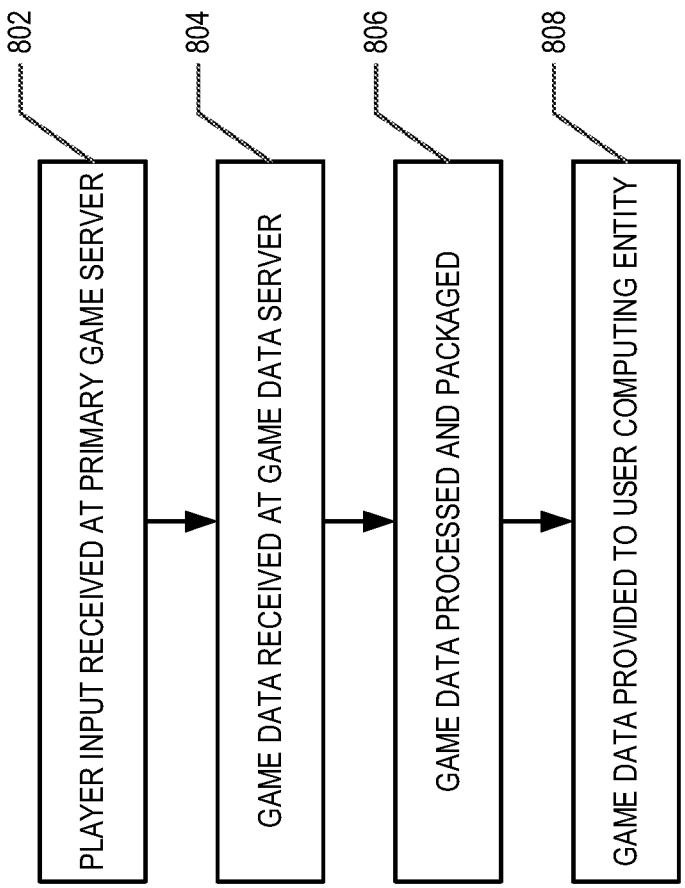
Figure 9:
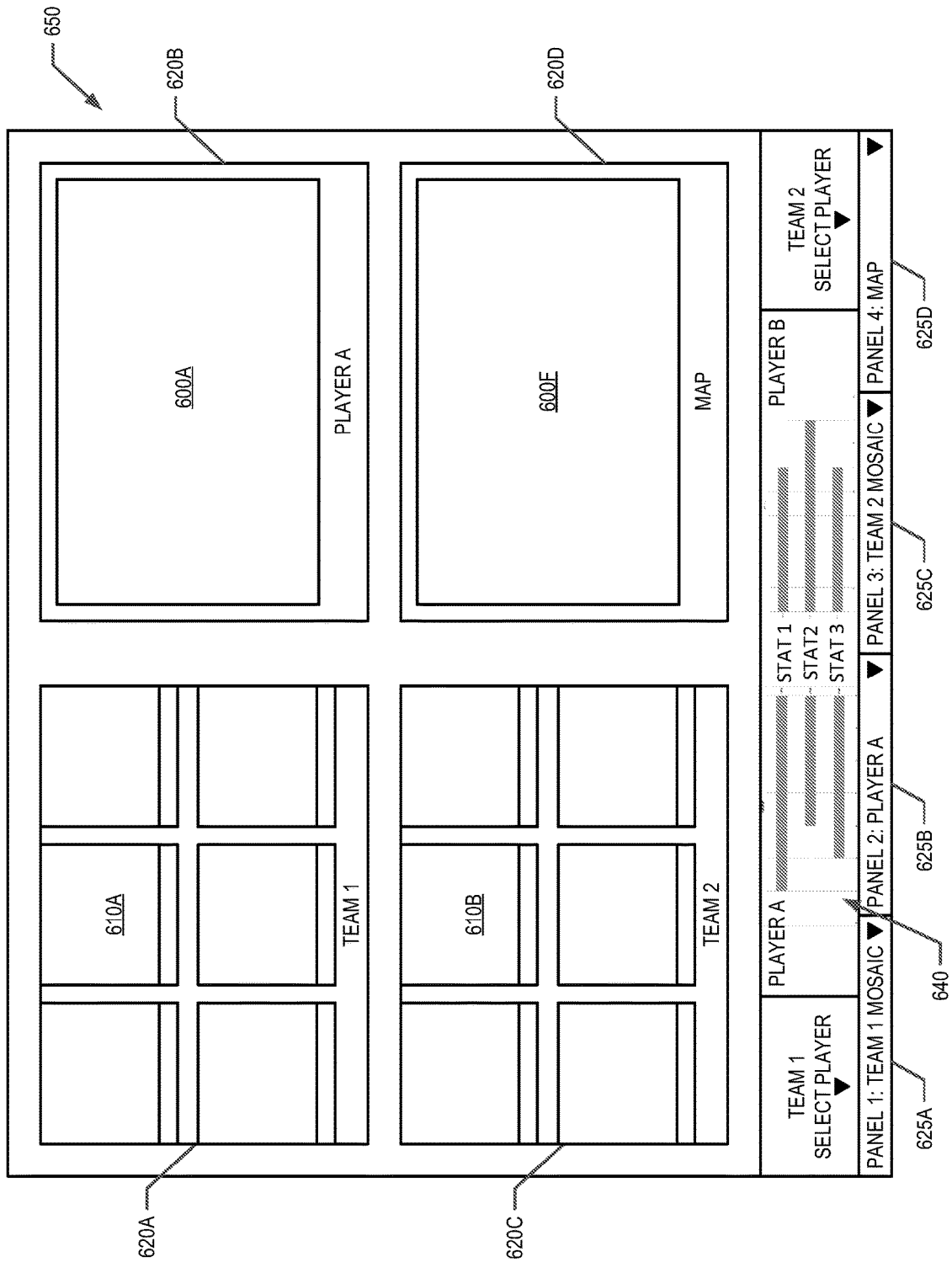
Figure 10:
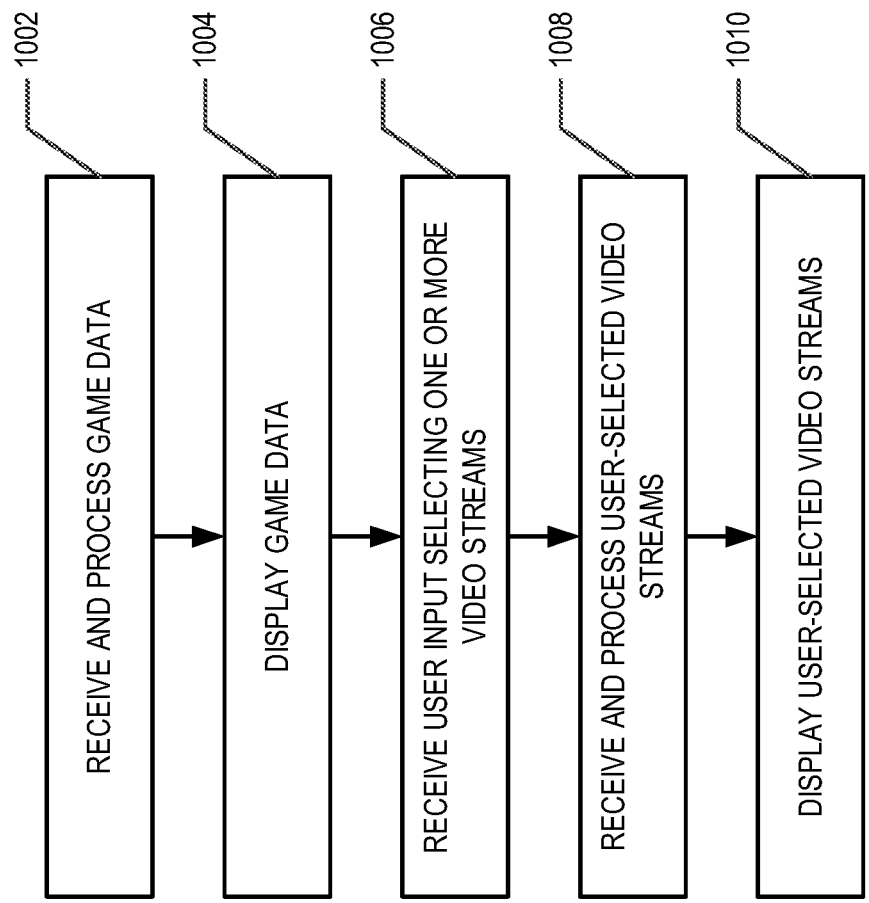

FIG. 5 provides a flowchart illustrating various processes, procedures, and/or operations completed by a video stream provider system for providing a viewer with a user interface through which a user may view a plurality of points of view of a virtual or digital environment, in accordance with various embodiments of the present invention;

FIG. 6 illustrates an example template, in accordance with an embodiment of the present invention;

FIG. 7 illustrates an example view of a plurality of points of view provided by a single video stream, in accordance with an embodiment of the present invention;

FIG. 8 provides a flowchart illustrating various processes, procedures, and/or operations completed by a game information/data server for providing a viewer with game information/data via the user interface, in accordance with an example embodiment of the present invention;

FIG. 9 provides a flowchart illustrating various processes, procedures, and/or operations completed by a user computing entity for providing a viewer with a user interface through which a user may view a plurality of points of view of a virtual or digital environment, in accordance with an example embodiment of the present invention; and FIG. 10 illustrates an example screen shot of an example user interface provided by a user computing entity to a viewer, according to an example embodiment of the present invention.

DETAILED DESCRIPTION OF VARIOUS EMBODIMENTS

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. And terms are used both in the singular and plural forms interchangeably. Like numbers refer to like elements throughout.

I. Methods, Apparatus, Systems, and Computer Program Products

Embodiments of the present invention may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. General Overview

Embodiments of the present invention provide methods, apparatus, systems, computer program products, computing devices, computing entities, and/or the like for providing a viewer with a user interface configured to provide one or more video streams to the viewer. At least one of the video streams that may be provided through the user interface comprises a plurality of points of view from within a virtual or digital environment. In an example embodiment, the one or more video streams may comprise real time or near real time action occurring within the virtual or digital environment. In a particular embodiment, the virtual or digital environment is an e-sport competition—such as a multiple player video game. In an example embodiment, the video stream comprising multiple points of view of the virtual or digital environment (also referred to herein as a mosaic video stream) may comprise one or more points of view of two or more of the players of the video game, participants in the esports competition, and/or the like. In an example embodiment, the mosaic video stream may also comprise a map (and/or other aspects) of the virtual or digital environment.

In an example embodiment, the virtual or digital environment may be generated by a game server executing computer-executable code. For example, a game server may execute computer-executable code configured to generate, operate, and/or the like a video game or other esports competition platform. For example, the game server may execute environment computer-executable code configured to generate virtual or digital environment. The action occurring within the virtual or digital environment may be based on input received from one or more players (e.g., using a player computing entity, joystick, or other input device(s) in communication with the game server) and/or the execution of the environment computer-executable code. One or more video streams may be provided by the game server and/or by a mirror or relay game server. Each of the video streams corresponds to one point of view within the virtual or digital environment. For example, the one or more video streams may comprise a video stream from the point of view of each player of the video game or participant in the esports competition. In an example embodiment, the one or more video streams may comprise one or more video stream each corresponding to a map of the virtual or digital environment. In an example embodiment, the one or more video streams may comprise one or more video streams each corresponding to a predetermined location or other location within the virtual or digital environment. In an example embodiment, the gamer server and/or mirror or relay server may further provide game information/data, such as statistics or attribute information corresponding to one or more players of the video game or participants in the esports competition.

In an example embodiment, each of the video streams may be processed individually. For example, for each video stream, one or more display parameters of the video stream may be modified, the video stream may be rendered, audio may be added to and/or removed from the video stream, and/or the like. In an example embodiment, the video stream may be converted from a first format to a second format. A plurality of video streams may then be combined into a single video stream using, for example, a multiviewer. The single point of view and mosaic video streams may then be provided to a streaming server configured to provide the video streams via a content distribution network.

A user computing entity operating an application configured to provide a user interface and/or accessing a user interface via the Internet or other network may receive at least a mosaic video stream via the content distribution network. A visual and/or audio display of the user computing entity may then display, provide, and/or the like at least one mosaic video stream to a viewer via the user interface. The user computing entity may also receive game information/data and display at least a portion of the game information/data via the user interface. In an example embodiment, the user interface may be configured to display, provide, and/or the like a plurality of video streams simultaneously. For example, in one embodiment, the user interface may be configured to display, provide, and/or the like four video streams simultaneously. One or more of the plurality of video streams may be a mosaic video stream. In an example embodiment, the one or more mosaic video streams may provide a point of view of each player of the video game or each participant in the esports competition. For example, if a video game has ten players and one map, the one or more mosaic video streams provided by the content distribution network may comprise the point of view of each of the ten players and the map. As will be recognized, various system architectures that may be used in accordance with the present invention will now be described herein.

III. Exemplary System Architecture

Figure 1:
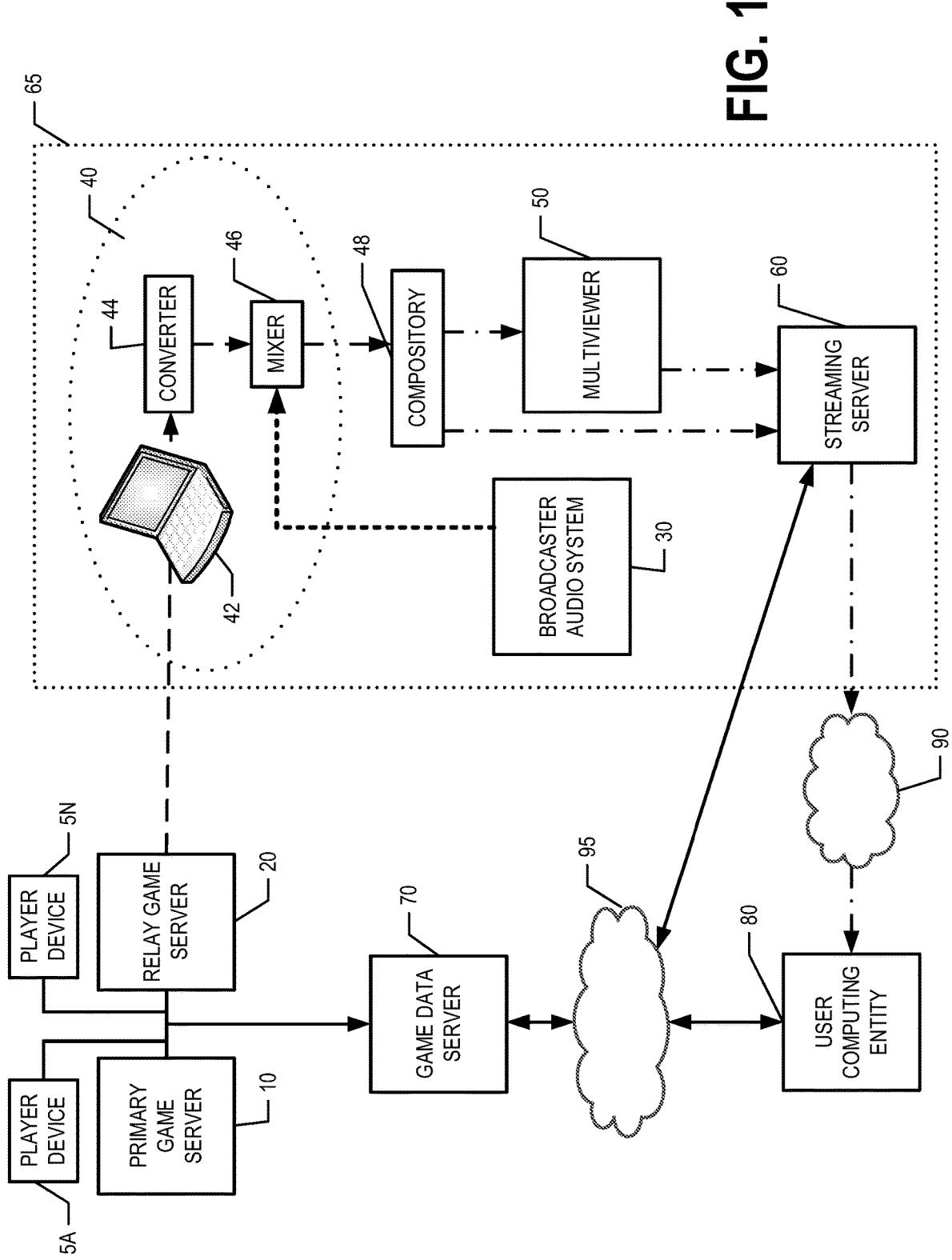
FIG. 1 illustrates one embodiment of a system for providing a viewer with a user interface through which a user may view a plurality of points of view of a virtual or digital environment, in accordance with one embodiment the present invention.

FIG. 1 illustrates one embodiment of a system that may implement the present invention. In this particular embodiment, the illustrated system may include one or more primary game servers 10, one or more relay game servers 20, one or more broadcaster audio systems 30, one or more production systems 65, one or more game information/data servers 70, one or more content distribution/delivery networks (CDNs) 90, one or more wired or wireless networks 95, and one or more user computing entities 80. Various elements of the system may communicate with each other and/or a variety of other computing entities via one or more wired or wireless networks 95. In an example embodiment, a production system may comprise one or more stream processing systems 40, one or more broadcaster audio systems 30, one or more compositories 48, one or more multiviewers 50, and one or more streaming servers 60. In an example embodiment, a stream processing system 40 may comprise a rendering computing entity 42, a converter 44, and a mixer 46. Although described separately, it will be recognized that two or more of the above entities can be combined or included in a single platform.

A. Content Distribution/Delivery Networks

In various embodiments, the one or more CDNs 90 may comprise networks configured for distributing media content. Generally, the term "content," "media," and similar words are used interchangeably to refer to any type of media—audio, videos, datacasts, music, text, images, graphics, articles, photos, photo galleries, video galleries, infographics, maps, polls, guest biographies, tweets or other social media, blog posts, and/or the like. For example, content may include television broadcasts (e.g., live local newscasts), television programs (e.g., The Office), sporting events, movies (e.g., video-on-demand (VOD)), datacasts, music, images, videos, text, webpages, and/or the like. Thus, the CDN 90 may be configured for providing a user with media content via a broadcast, such as via an over-the-air content delivery/distribution network, a linear content delivery/distribution network, a cable content delivery/distribution network, a satellite content delivery/distribution network, an internet-based content delivery/distribution network, and/or the like.

i. Over-the-Air Content Delivery/Distribution Network

An over-the-air (OTA) CDN 90 can be used in conjunction with embodiments of the present invention. The OTA CDN 90 may be owned and/or operated by a broadcaster (e.g., KCRG, KFXA, KFXB, KGAN, KIIN, KPXR, KRIN, KWKB, KWWF, and/or KWWL) and associated with a broadcast area (e.g., Cedar Rapids-Waterloo-Iowa City-Dubuque broadcast area). Broadcast areas may be designated market areas (DMAs), zip codes, block groups, census tracts, cartographic levels, government-established areas/zones, geographic areas, and/or the like. As will be recognized, a broadcaster may have one or more OTA CDNs 90 depending on the geographic area (e.g., DMA, zip code, block group, census tract, cartographic level, government-established area/zone, geographic area, and/or the like) the broadcast area includes.

An OTA CDN 90 may include various components to transmit/broadcast content and/or data/information via an OTA broadcast (e.g., an OTA broadcast signal) to be received by one or more distribution devices 105. In one embodiment, the OTA CDN 90 may include one or more channel coding elements, one or more modulation elements, and one or more transmitters. Although not shown, the OTA CDN 90 may also include various other components, such as audio subsystems, video subsystems, multiplexers, exciters, drivers, amplifiers, network interfaces, processing elements, and/or the like. Via these elements, for instance, the OTA CDN 90 can transmit/broadcast OTA broadcasts (comprising content and/or data) within a broadcast area. The OTA CDN 90 may transmit/broadcast the broadcast (e.g., OTA broadcast) using a variety of standards and protocols, such as Advanced Television Systems Committee (ATSC), Terrestrial Integrated Services Digital Broadcasting (ISDB-T), Terrestrial Digital Multimedia Broadcasting (T-DMB), Digital Video Broadcasting-Terrestrial (DVB-T), Digital Video Broadcasting-Handheld (DVB-H), Digital Terrestrial Multimedia Broadcast (DTMB), Satellite Terrestrial Interactive Multi-service Infrastructure (STiMi), National Television System Committee (NTSC) standards and protocols, and/or the like.

It will be appreciated that one or more of a CDN's 10 components and other broadcaster components may be located remotely from one another. Furthermore, one or more of the components may be combined and additional components performing functions described herein may be included.

ii. Cable Content Delivery/Distribution Network

Although not shown, a cable CDN 90 (also referred to as a CDN 90) may be used with embodiments of the present invention. A cable CDN 90 may include various components to transmit/broadcast content and/or data/information via the cable provider's CDN 90 to the cable provider's subscribers. For example, in various embodiments, the cable CDN 90 may include a network operations center, a cable modem termination system, and a headend to transmit cable broadcasts (e.g., digital cable signals) through the cable provider's CDN 90 to user computing entities 30. Thus, user computing entities 30 may communicate with a headend over a distribution network.

To perform such functions, the cable CDN 90 may include various components, such as audio subsystems, video subsystems, multiplexers, switches, encoders, satellite receivers and antennae, network interfaces, decoding elements, encoding elements, processing elements, transmitting elements, modulation elements, and/or the like. The cable CDN 90 may be capable of receiving content and/or data/information and/or transmitting content and/or data/information (e.g., transmit broadcast signals in a one-to-many or broadcast configuration) using a variety of standards and protocols to user computing entities 30, including those described with regard to the OTA CDN 90 and/or further including various versions of data/information over cable service interface specification (DOCSIS).

iii. Satellite Content Delivery/Distribution Network

Although not shown, a satellite CDN 90 (also referred to as a CDN 90) may be used with embodiments of the present invention. A satellite CDN 90 may include various components to transmit/broadcast content and/or data/information (e.g., transmit broadcast signals in a one-to-many or broadcast configuration) via the satellite provider's CDN 90 to user computing entities 30 (e.g., subscribers). For example, in various embodiments, the satellite CDN 90 may include uplink facilities (with transmitting antennae), satellites (with transponders), receiving satellite dishes, and/or user computing entities 30. Thus, the satellite CDN 90 can transmit/broadcast satellite broadcasts (comprising content and/or data) to user computing entities 30 using a variety of standards and protocols, such as those described with regard to the OTA CDN 90 and/or further including direct broadcast satellite (DBS), television receive only (TVRO), and/or the like.

iv. Internet-Based Delivery/Distribution Network

Although not shown, an internet-based CDN 90 (also referred to as a CDN 90) may be used with embodiments of the present invention. An internet-based CDN 90 may include various components to transmit/broadcast content and/or data/information (e.g., transmit broadcast signals in a one-to-many or broadcast configuration) via the provider's CDN 90 to user computing entities 30 (e.g., subscribers). Thus, the internet-based CDN 90 can transmit/broadcast broadcasts (comprising content and/or data) to user computing entities 30 using a variety of standards and protocols, such as those described previously. As described above, CDNs 90 may involve one or more of the above-described types of CDN networks—e.g., OTA networks, satellite networks, cable networks, internet-based networks, other networks, and/or combinations thereof.

B. Primary Game Server

In various embodiments, a primary game server 10 may be configured to generate, operate, provide, and/or the like a virtual or digital environment in which an esports competition may take place. For example, the primary game server 10 may store and/or execute environment computer-executable code to provide, generate, operate, and/or the like a virtual or digital environment. For example, the primary game server 10 may provide a platform for the playing of a video game or a platform for another esports competition.

Figure 2:
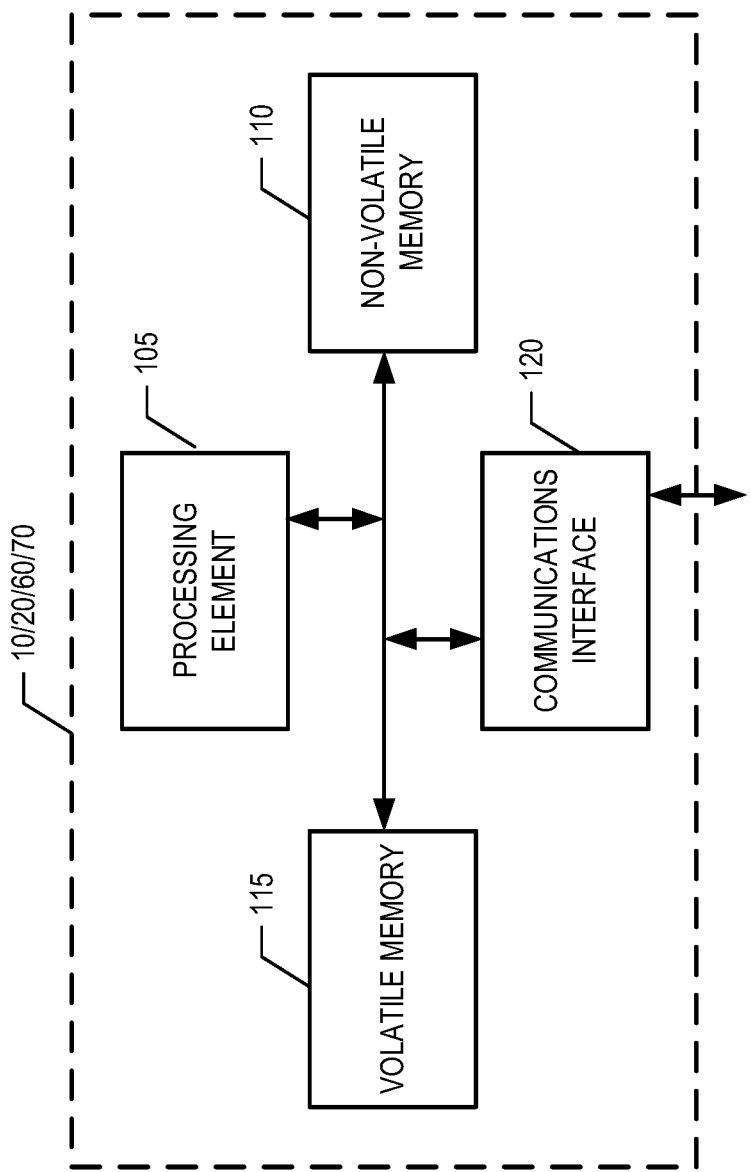
FIG. 2 is a schematic diagram of a representative server, such as a primary game server, relay game server, streaming server, or game information/data server, in accordance with an embodiment of the present invention.

FIG. 2 provides a schematic of a primary game server 10 according to one embodiment of the present invention. In general, the terms computing entity, entity, device, system, and/or similar words used herein interchangeably may refer to, for example, one or more computers, computing entities, desktop computers, mobile phones, tablets, phablets, notebooks, laptops, distributed systems, gaming consoles (e.g., Xbox, Play Station, Wii), servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the primary game server 10 may also include one or more communications interfaces 120 for communicating with various computing entities, such as by communicating information/data, content, information, and/or similar terms used herein interchangeably that can be transmitted, received, operated on, processed, displayed, stored, and/or the like. For instance, the primary game server 10 may communicate with a relay game server 20, a game information/data server 70, one or more player computing entities and/or player input devices, and/or the like.

As shown in FIG. 2, in one embodiment, the primary game server 10 may include or be in communication with one or more processing elements 105 (also referred to as processors, processing circuitry, and/or similar terms used herein interchangeably) that communicate with other elements within the primary game server 10 via a bus, for example. As will be understood, the processing element 105 may be embodied in a number of different ways. For example, the processing element 105 may be embodied as one or more complex programmable logic devices (CPLDs), microprocessors, multi-core processors, coprocessing entities, application-specific instruction-set processors (ASIPs), and/or controllers. Further, the processing element 105 may be embodied as one or more other processing devices or circuitry. The term circuitry may refer to an entirely hardware embodiment or a combination of hardware and computer program products. Thus, the processing element 105 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 105 may be configured for a particular use or configured to execute instructions stored in volatile or non-volatile media or otherwise accessible to the processing element 105. As such, whether configured by hardware or computer program products, or by a combination thereof, the processing element 105 may be capable of performing steps or operations according to embodiments of the present invention when configured accordingly.

In one embodiment, the primary game server 10 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 110 as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media may store databases, database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably may refer to a structured collection of records or information/data that is stored in a computer-readable storage medium, such as via a relational/database, hierarchical database, and/or network database. For example, the primary game server 10 may store computer-executable code, such as environment computer-executable code, configured to provide, generate, operate, and/or the like a virtual or digital environment, and to coordinate, facilitate, and/or the like the playing of a video game or another esports competition within the virtual or digital environment.

In one embodiment, the primary game server 10 may further include or be in communication with volatile media (also referred to as volatile storage, memory, memory storage, memory circuitry and/or similar terms used herein interchangeably). In one embodiment, the volatile storage or memory may also include one or more volatile storage or memory media 115 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media may be used to store at least portions of the databases, database instances, database management system entities, data, applications, programs, program modules, scripts, source code, object code, byte code, compiled code, interpreted code, machine code, executable instructions, and/or the like being executed by, for example, the processing element 205. Thus, the databases, database instances, database management system entities, data, applications, programs, program modules, scripts, source code, object code, byte code, compiled code, interpreted code, machine code, executable instructions, and/or the like may be used to control certain aspects of the operation of the primary game server 10 with the assistance of the processing element 105 and operating system.

As indicated, in one embodiment, the primary game server 10 may also include one or more communications interfaces 120 for communicating with various computing entities, such as by communicating data, content, information, and/or similar terms used herein interchangeably that can be transmitted, received, operated on, processed, displayed, stored, and/or the like. For instance, the primary game server 10 may communicate with computing entities or communication interfaces of the relay game server 20, the game information/data server 70, one or more player computing entities and/or player input devices, and/or the like.

As indicated, in one embodiment, the primary game server 10 may also include one or more communications interfaces 120 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the services computing entity 120 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol. The services computing entity 120 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User datagram Protocol (UDP), information/datagram Congestion Control Protocol (DCCP), Stream Control Transmission Protocol (SCTP), HyperText Markup Language (HTML), and/or the like. In an example embodiment, a primary game server 10 may communicate with one or more player computing entities and/or input devices, and/or other computing entities, via low energy Bluetooth, ZigBee, z-wave, or other short or long range communication protocol.

As will be appreciated, one or more of the primary game server 10 components may be located remotely from other primary game server 10 components, such as in a distributed system. Furthermore, one or more of the components may be combined and additional components performing functions described herein may be included in the primary game server 10. Thus, the primary game server 10 can be adapted to accommodate a variety of needs and circumstances.

C. Relay Game Server

In general, relay game server 20, or mirror game server, is a computing entity operated in tandem with the primary game server 10. For example, they relay game server 20 may receive information/data corresponding to the virtual or digital environment and/or one or more actions occurring within the virtual or digital environment from the primary game server 10. In an example embodiment, the relay game server 20 mirrors the primary game server 10. In one embodiment, the relay game server 20 may each include one or more components that are functionally similar to those of the primary game server 10. For example, in one embodiment, each of the relay game servers 20 may include: (1) a processing element that communicates with other elements via a system interface or bus; (2) a user interface; (3) transitory and non-transitory memory; and (4) a communications interface. For example, the relay game server 20 may store and/or execute environment computer-executable code, receive player and/or participant input from one or more player computing entities and/or input devices, provide game information/data to the game information/data server 70 (e.g., via an application program interface (API)), provide one or more video streams to one or more rendering computing entities 42, wherein each video stream captures the action and surroundings of the virtual or digital environment from a particular point of view within the virtual or digital environment, and/or the like.

D. Stream Processing System

In an example embodiment, each video stream provided by the relay game server 20 may be processed by a stream processing system 40. For example, each stream processing system 40 may correspond to one video stream. For example, in an example embodiment in which the relay game server 20 provides eleven video streams corresponding to eleven different points of view within the virtual or digital environment (e.g., one point of view from each of ten players and a map of the virtual or digital environment), the production system 65 may comprise eleven stream processing systems 40. In another example embodiment, a computing entity may act as the stream processing system 40 for all of the video streams. In the illustrated example embodiment, a stream processing system 40 may comprise a rendering computing entity 42, a converter 44, and a mixer 46.

In an example embodiment, a rendering computing entity 42 may be configured to receive a video stream from the relay game server 20 through a wired or wireless communication (e.g., an intranet, Wi-Fi network, and/or the like). The rendering computing entity 42 may modify or adjust one or more display parameters of the video stream. For example, the display parameters may comprise contrast, color balance, saturation, orientation, and/or the like. The rendering computing entity 42 may process the video stream and modify one or more elements of the video stream based on a set of preferred display parameters such that the video stream is rendered in accordance with the preferred display parameters. In an example embodiment, the rendering computing entity 42 may render the video stream in accordance with the preferred display parameters. Further, the rendering computing entity 42 may render the video stream within a template, frame, and/or the like. For example, a template or frame may comprise a point of view title and a frame within which the video stream is inserted. In one embodiment, the rendering computing entity 42 may each include one or more components that are functionally similar to those of the primary game server 10 and/or relay game server 20. For example, in one embodiment, each of the rendering computing entities 42 may include: (1) a processing element that communicates with other elements via a system interface or bus; (2) a user interface; (3) transitory and non-transitory memory; and (4) a communications interface. For example, the rendering computing entities 42 store and/or execute computer-executable code for modifying one or more display parameters of a video stream, and rendering the video stream in accordance with preferred display parameters and/or within a template or frame.

The converter 44 may be configured to receive the video stream as rendered by the rendering computing entity 42 in a first format and convert the videos stream to second format. In an example embodiment, the second format is a broadcast television format. For example, the converter may receive the video stream from the rendering computing entity 42 in High-Definition Multimedia Interface (HDMI) format and convert the video stream to high-definition serial digital interface (HD-SDI) format. In an example embodiment, the converter 44 may perform frame synchronization on the video stream. The converter 44 may then provide the video stream in the second format to the mixer 46.

In an example embodiment, the mixer 46 may be configured to add broadcaster audio information/data to the video stream. For example, the video stream may comprise environmental noise corresponding to the action occurring with the virtual or digital environment from the view point corresponding to the video stream. For example, the video stream may comprise sounds of gun shots or other environmental sounds as heard by a player, participant, or observer within the virtual or digital environment at the point of view corresponding to the video stream. In an example embodiment, the broadcaster audio may be added to the video stream such that the discussion of the broadcaster audio is aligned with the events occurring within the virtual or digital environment as seen in the visual component of the video stream and heard from the environmental sounds of the video stream. For example, if the broadcaster audio includes a comment about an individual hiding behind a rock, the comment may be aligned with the video stream such that the comment is included about the time the individual hides behind the rock and not before the individual hides behind the rock or after the individual has moved out from behind the rock. Thus, the mixer 46 may be configured to align and/or add broadcaster audio information/data to the video stream.

In an example embodiment, the mixer 46 may provide the video stream to a compository 48. In an example embodiment, the compository 48 may be configured to process a plurality of video streams. For example, the compository 48 may be comprise a processor configured to adjust the audio of each video stream such that the audio level within each video stream is consistent with the other video streams and that the audio level is in compliance and/or accordance with one or more broadcaster audio parameters. For example, the compository 48 may be configured to ensure that the audio levels of the plurality of video streams are consistent. For example, the compository 48 may be configured to ensure that the broadcaster audio and/or other audio is at the same audio level in each video stream. In an example embodiment, the compository 48 may be configured to ensure that none of the audio within any of the video streams surpasses a maximum audio level, and/or the like.

E. Broadcaster Audio System

In an example embodiment, a broadcaster audio system 30 may be configured to receive and process broadcaster audio information/data and provide the broadcaster audio information/data to one or more mixers 46. For example, one or more broadcasters or commentators may watch the action occurring within the virtual or digital environment on one or more monitors or other display devices and provide commentary, play-by-play action, and/or the like to the broadcaster audio system 30 (e.g., via a microphone). In an example embodiment, the broadcaster audio system 30 may comprise one or more elements similar to the primary game server 10, relay game server 20, rendering computing entity 42, and/or the like. For example, in one embodiment, the broadcaster audio system 30 may include: (1) a processing element that communicates with other elements via a system interface or bus; (2) a user interface; (3) transitory and non-transitory memory; and (4) a communications interface. For example, the broadcaster audio system 30 may comprise and/or be in communication with one or more user input devices. For example, the user input devices may comprise one or more microphones, one or more user interfacing components configured and/or programmed for engineering the audio, and/or the like.

F. Multiviewer

Figure 3:
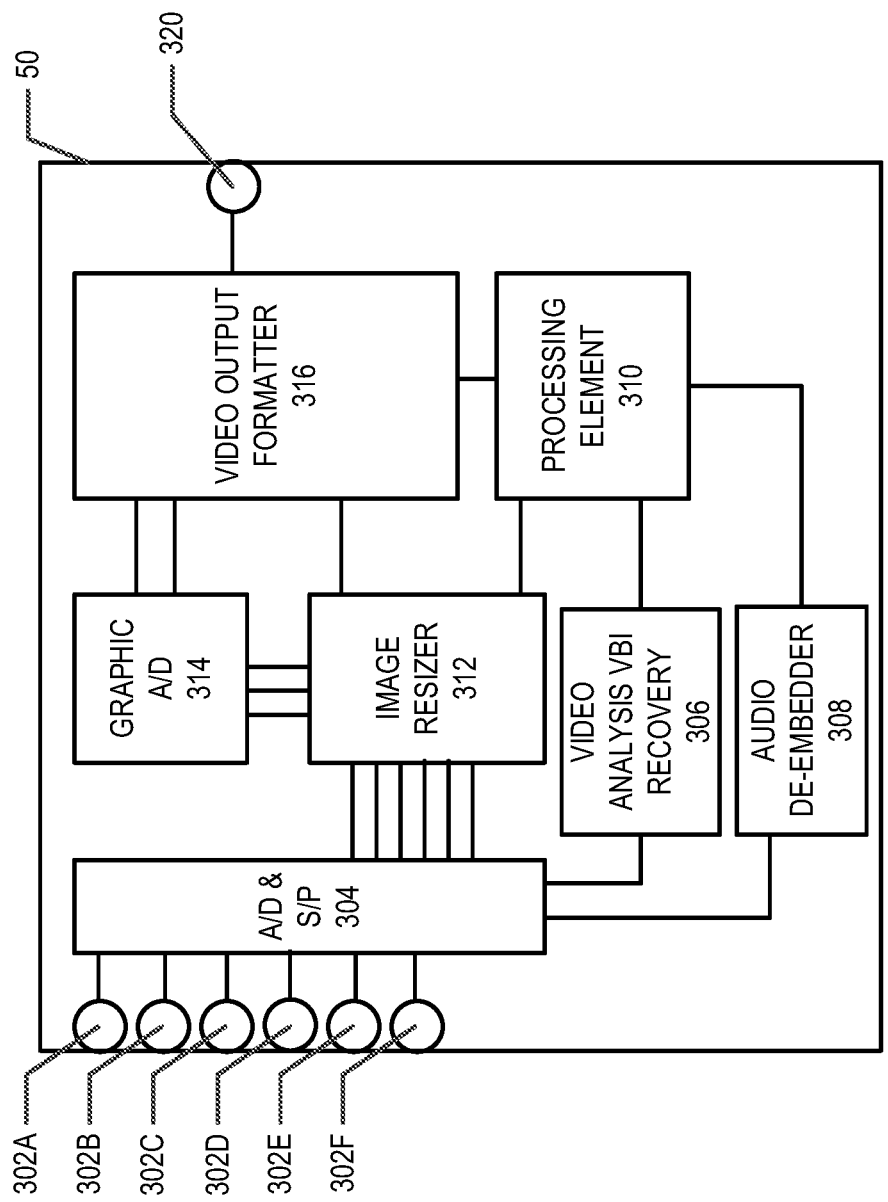
FIG. 3 is a schematic diagram of a multiviewer, in accordance with an embodiment of the present invention.

In an example embodiment, the production system 65 comprises one or more multiviewers 50. In an example embodiment, a multiviewer 50 or multi-image processor, is configured and/or programmed to receive a plurality of video streams as input and generate a video stream comprising each of the plurality of input video streams. In particular, the multiviewer 50 may be configured to receive a plurality of video streams and to provide a mosaic video stream. FIG. 3 illustrates an example multiviewer 50, according to an example embodiment. In this embodiment, the multiviewer 50 may comprise a plurality of inputs 302 (e.g., 302A-F). For example, the multiviewer 50 may be configured to receive a video stream via a wired connection through one of the inputs 302, wherein the video stream is in the second format. An input 302 may be a male or female connector for a wired communication corresponding to the wire-type corresponding to the second format. For example, an input 302 may be female connector corresponding to an SDI or HD-SDI cable.

The multiviewer 50 may further comprise an analog to digital converter (A/D) and signal processing (S/P) 304, a video analysis vertical blanking interval (VBI) recovery component 306, audio de-embedder 308, processing element 310, image resizer 312, graphic analog to digital converter 314, and video output formatter 316. For example, the multiviewer 50 may comprise components configured to process the plurality of input video streams, de-embed the audio information/data from each stream, compile and/or generate mosaic audio information/data, and embed the mosaic audio information/data in the output video stream. Additionally, the multiviewer 50 may comprise components configured to process the plurality of input video streams and compile the visual information/data of the video streams into a single set of visual information/data, and format the single set of visual information/data to provide an output mosaic video stream. For example, the mosaic video stream may comprise mosaic visual information/data and/or mosaic audio information/data corresponding to a plurality of points of view within the virtual or digital environment.

The multiviewer 50 may further comprise an output 320. For example, the multiviewer 50 may be configured to provide a video stream via a wired connection through the output 320, wherein the video stream is in a predetermined format (e.g., the second format). For example, the output 320 may be a male or female connector for a wired communication corresponding to the wire-type corresponding to the second format. For example, the output 320 may be female connector corresponding to an SDI or HD-SDI cable.

G. Streaming Server

A streaming server 60 may be configured to encode, tag, package, and/or the like one or more video streams and provide the one or more video streams to one or more CDNs 90 for provision of the video stream(s) to user computing entities 80 thereby. For example, a streaming server 60 may encode one or more video streams, embed one or more tags within the video stream (e.g., to identify the corresponding esports competition, point of view, team affiliation, and/or the like), packetize the video stream, and/or the like. The streaming server 60 may then provide the video stream(s) to one or more CDNs 90. In one embodiment, the streaming server 60 may include one or more components that are functionally similar to those of the primary game server 10 or relay game server 20. For example, in one embodiment, each of the streaming servers 60 may include: (1) a processing element that communicates with other elements via a system interface or bus; (2) a user interface; (3) transitory and non-transitory memory; and (4) a communications interface.

H. Game Information/Data Server

The game information/data server 70 may be configured and/or programmed to query the primary game server 10 and/or relay game server 20 for game information/data and/or receive game information/data from the primary game server 10 and/or the relay game server 20. For example, the game information/data server 70 may be configured to execute an API configured and/or programmed to interface with the primary game server 10 and/or the relay game server 20 such that the game information/data server 70 receives game information/data therefrom. The game information/data server 70 may be configured to process game information/data based on various criteria and/or categories. For example, the game information/data may be processed based on team affiliations associated with each player, a priority associated with a particular action within the virtual or digital environment, and/or the like. The game information/data server 70 may then provide at least a portion of the game information/data to one or more user computing entities 80, for example, through one or more wired or wireless networks 95 and/or a CDN 90. For example, an application operating on the user computing entity 80 may comprise an API configured to interface with the game information/data server 70 to receive game information/data therefrom. In another example, the game information/data server 70 may provide an Internet accessible web site, portal, and/or the like that a viewer may access via a user computing entity 80 to access a user interface that displays at least a portion of the game information/data. In one embodiment, the game information/data server 70 may include one or more components that are functionally similar to those of the primary game server 10, relay game server 20, or streaming server 60. For example, in one embodiment, each of the game information/data servers 70 may include: (1) a processing element that communicates with other elements via a system interface or bus; (2) a user interface; (3) transitory and non-transitory memory; and (4) a communications interface.

I. User Computing Entity

The game information/data server 70 may be configured and/or programmed to query the primary game server 10 and/or relay game server 20 for game information/data and/or receive game information/data from the primary game server 10 and/or the relay game server 20. For example, the In various embodiments, the user computing entity 80 may be configured to provide a user interface for providing a user with one or more video streams of action occurring within a virtual or digital environment. In an example embodiment, the user interface is configured to provide the one or more video streams to the user in real time or near real time with respect to the action occurring within the virtual or digital environment. In an example embodiment, at least one of the video streams is a mosaic video stream. In an example embodiment, the user interface may be further configured to provide a user with game information/data in real time or near real time with the events occurring within the virtual or digital environment. For example, as described above, a user computing entity 80 may be one or more computers, mobile phones, gaming consoles (e.g., Xbox, Play Station, Wii), desktops, Rokus, Apple TVs, Chromecasts, tablets, notebooks, phablets, set-top devices in communication with a television or other audio/video device (e.g., projector and/or the like), smart televisions, laptops, wearable computer (e.g., smart watch, heads up device, and/or the like), and/or any combination of devices or entities adapted to perform the functions, operations, and/or processes described herein. In one embodiment, the user computing entity 80 may comprise a combination of two or more computing devices noted above and/or other computing devices. For example, a user computing entity 80 may comprise a set top box "paired" with a tablet.

In one embodiment, the user computing entity 80 may include one or more components that are functionally similar to those of the primary game server 10, relay game server 20, broadcaster audio system 30, streaming server 60, game information/data server 70, and/or the like. In one embodiment, the user computing entity 80 may include one or more processing elements, one or more audio/video device/input devices, volatile and non-volatile storage or memory, and/or one or more communications interfaces. The user computing entity 80 may also comprise various other systems. In particular, the user computing entity 80 may include components configured to receive user input selecting one or more video streams that the user would like the user interface to provide (e.g., display, and/or the like). The user computing entity 80 may also be in communication with a variety of computing entities.

In various embodiments, the user computing entity 80 may include or otherwise be in communication with a variety of input devices that may be configured to receive input from a user such that a user may provide profile information/data that may be used for providing a user preferences, user input selecting one or more video streams to be viewed via the user interface, and/or the like. For example, in some embodiments, the user computing entity 80 may include or be in communication with a pointing device such as a computer mouse, infrared pointing device, motion detecting device, and/or the like. In other embodiments, the user computing entity 80 may include or be in communication with a joy stick, remote control, handheld controller which may include a d-pad, and/or the like. In an example embodiment, the user computing entity 80 comprises a touch screen. Thus, the user computing entity 80 may be configured to receive user input through a variety of input approaches and techniques.

Figure 4:
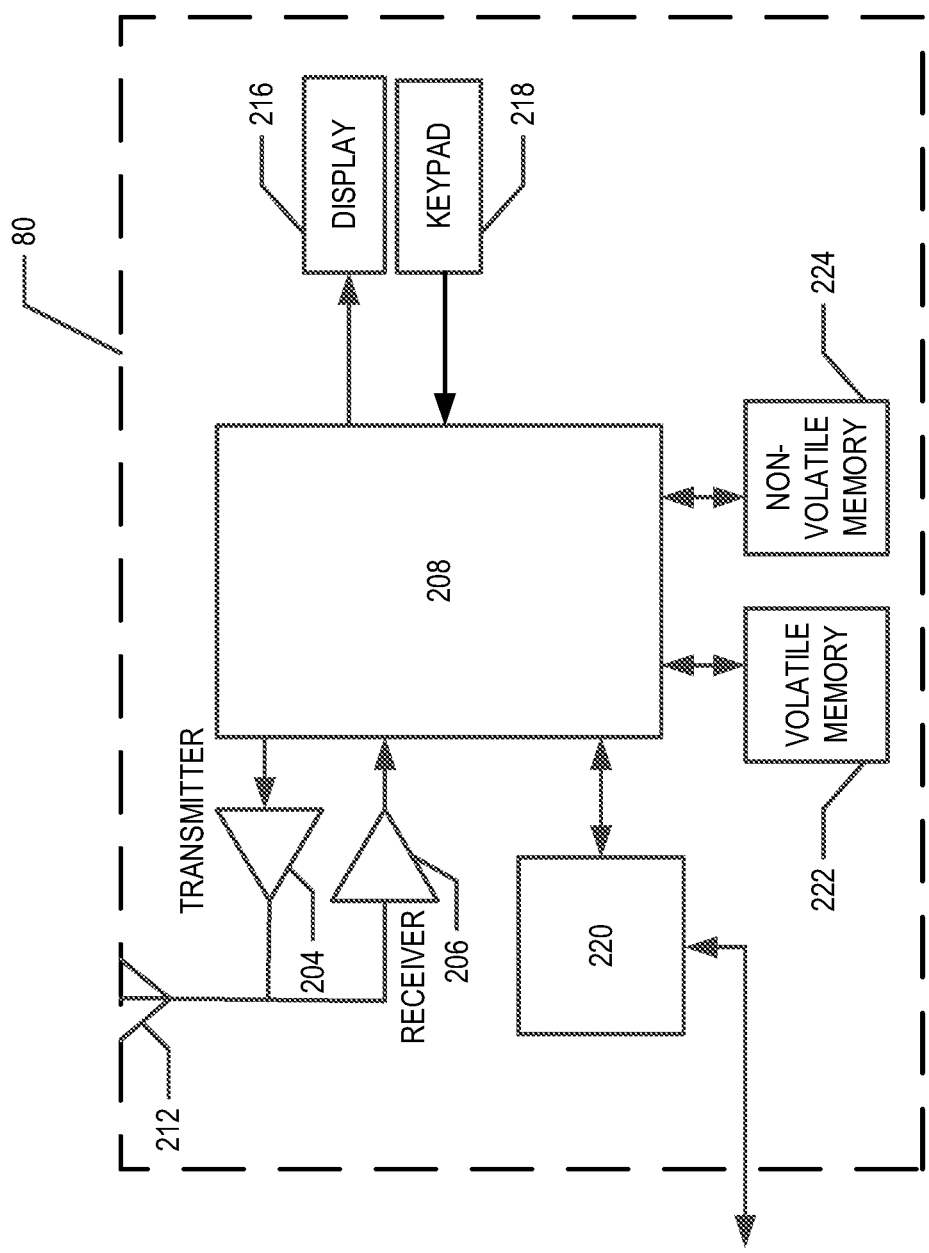
FIG. 4 is a schematic diagram of a user computing entity, in accordance with an embodiment of the present invention.

FIG. 4 provides an illustrative schematic representative of an example user computing entity 80 that can be used in conjunction with embodiments of the present invention. As shown in FIG. 4, the user computing entity 80 can include an antenna 212, a transmitter 204 (e.g., radio), a receiver 206 (e.g., radio), and a processing element 208 (e.g., CPLDs, microprocessors, multi-core processors, coprocessing entities, ASIPs, microcontrollers, and/or controllers) that provides signals to and receives signals from the transmitter 204 and receiver 206, respectively.

The signals provided to and received from the transmitter 204 and the receiver 206, respectively, may include signaling information/data in accordance with air interface standards of applicable wireless systems. In this regard, the user computing entity 80 may be capable of operating with one or more air interface standards, communication protocols, modulation types, and access types. More particularly, the user computing entity 80 may operate in accordance with any of a number of wireless communication standards and protocols, such as those described above with regard to the primary game server 10. In a particular embodiment, the user computing entity 80 may operate in accordance with multiple wireless communication standards and protocols, such as UMTS, CDMA2000, 1×RTT, WCDMA, GSM<EDGE, TD-SCDMA, LTE, E-UTRAN, EVDO, HSPA, HSDPA, Wi-Fi, Wi-Fi Direct, WiMAX, UWB, IR, NFC, Bluetooth, USB, Bluetooth low energy (BLE), ZigBee, NFC, IR, UWB, and/or the like. Similarly, the user computing entity 80 may operate in accordance with multiple wired communication standards and protocols, such as those described above with regard to the primary game server 10 via a network interface 220.

Via these communication standards and protocols, the user computing entity 80 can communicate with various other entities using concepts such as Unstructured Supplementary Service data (USSD), Short Message Service (SMS), Multimedia Messaging Service (MIMS), Dual-Tone Multi-Frequency Signaling (DTMF), and/or Subscriber Identity Module Dialer (SIM dialer). The user computing entity 80 can also download changes, add-ons, and updates, for instance, to its firmware, software (e.g., including executable instructions, applications, program modules), and operating system.

According to one embodiment, the user computing entity 80 may include location determining aspects, devices, modules, functionalities, and/or similar words used herein interchangeably. For example, the user computing entity 80 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This information/data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the user computing entity's 80 position in connection with a variety of other systems, including wireless towers, Wi-Fi access points, and/or the like. Similarly, the user computing entity 80 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, wireless towers, nearby computing devices (e.g., smartphones, laptops) and/or the like. For instance, such technologies may include the iBeacons, Gimbal proximity beacons, BLE transmitters, NFC transmitters, infrared transmitters, ZigBee transmitters, ultra-wideband transmitters, and/or the like. These indoor positioning aspects can be used in a variety of settings to determine the location of someone or something to within inches or centimeters.

The user computing entity 80 may also comprise a user interface (that can include a display 216 coupled to a processing element 208) and/or a user input interface (coupled to a processing element 208). For example, the user interface may be a user application, browser, user interface, and/or similar words used herein interchangeably executing on and/or accessible via the user computing entity 80 to interact with and/or cause display of information/data from the game information/data server 70, CDN 90, and/or streaming server 60, as described herein. The user input interface can comprise any of a number of devices or interfaces allowing the user computing entity 80 to receive information/data, such as a keypad 218 (hard or soft), a touch display, voice/speech or motion interfaces, or other input device. In embodiments including a keypad 218, the keypad 218 can include (or cause display of) the conventional numeric (0-9) and related keys (#, *), and other keys used for operating the user computing entity 80 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The user computing entity 80 can also include volatile storage or memory 222 and/or non-volatile storage or memory 224, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the user computing entity 80. As indicated, this may include a user application that is resident on the entity or accessible through a browser or other user interface for communicating with the game information/data server 70, CDN 90, streaming server 60, and/or various other computing entities.

In another embodiment, the user computing entity 80 may include one or more components or functionality that are the same or similar to those of the primary game server 10, relay game server 20, broadcaster audio system 30, streaming server 60, game information/data server 70, and/or the like, as described in greater detail above. As will be recognized, these architectures and descriptions are provided for exemplary purposes only and are not limiting to the various embodiments.

J. Player Computing Device and/or Input Device

In an example embodiment, a player may be a participant in the action occurring in the virtual or digital environment. In an example embodiment, a player computing device and/or input device 5 (e.g., 5A, . . . , 5N) may each include one or more components that are functionally similar to those of the primary game server 10, relay game server 20, broadcaster audio system 30, streaming server 60, game information/data server 70, and/or user computing entity 80. For example, in one embodiment, each of the player computing devices and/or input devices 5 may include: (1) a processing element that communicates with other elements via a system interface or bus; (2) a user interface; (3) transitory and non-transitory memory; and (4) a communications interface. For example, the player computing device and/or input device 5 may store and/or execute environment computer-executable code, receive player and/or participant input via an input devices (joystick, keyboard, mouse, and/or the like) and provide the user input and/or an indication thereof to the primary and/or relay game servers 10, 20. For example, the user input received by the player computing device and/or input device 5 and provided to the primary and/or relay game servers 10, 20 may cause one or more actions to occur within the virtual or digital environment.

IV. Exemplary System Operation

As described above, embodiments of the present invention provide methods, apparatus, systems, computer program products, computing devices, computing entities, and/or the like for providing a user interface to a viewer of an esports competition, video game, and/or the like. For example, the user interface may be configured and/or programmed to provide, display, and/or the like one or more mosaic video streams. For example, each mosaic video stream may comprise video information/data captured from a plurality of points of view within a virtual or digital environment. For example, the user interface may be configured and/or programmed to provide, display and/or the like a video information/data from a point of view of each player, participant, competitor, and/or the like of the esports competition, video game, and/or the like occurring within the virtual or digital environment. For example, the user interface may be configured and/or programmed to provide and/or display video streams of the action occurring within the virtual or digital environment in real time and/or near real time with respect to the occurrence of the events and/or action within the virtual or digital environment.

In general, a mosaic video stream is a single video stream that comprises video information/data from a plurality of points of view within the virtual or digital environment. For example, a plurality of video streams may be extracted and/or received from the primary and/or relay game server 10, 20. Each of the video streams includes video information/data and audio information/data corresponding to a single point of view within the virtual or digital environment. Each of the single point of view video streams may be processed to adjust, modify, and/or the like one or more rendering parameters (e.g., contrast, color balance, saturation, orientation, scaling, and/or the like), one or more audio parameters (e.g., volume, audio level, and/or the like), one or more elements of audio information/data (e.g., adding broadcaster audio information/data to the audio information/data of the video stream), and/or the like. A plurality (e.g., two or more) of the single point of view video streams may be combined, spliced together, linked, joined, and/or the like into a mosaic video stream. For example, the mosaic video stream may comprise mosaic audio information/data and mosaic video information/data. The mosaic audio information/data may comprise the audio information/data from one of the single point of view video stream or a combination of the audio information/data from two or more of the single point of view video streams. The mosaic video information/data comprises video information/data from two or more of the single point of view video streams. Thus, the mosaic video stream is generated by combining, linking, joining, splicing together, and/or the like a plurality (e.g., two or more) of the single point of view video streams. For example, the mosaic video stream may be generated using a multiviewer 50. For example, a plurality of single point of view video streams may be provided as input to a multiviewer 50. The multiviewer may combine, link, join, splice together, and/or the like the single point of view video streams to generate the mosaic video stream. Various aspects of generating and providing the mosaic video stream and providing and/or displaying the mosaic video stream via the user interface of a user computing entity 80 are provided in more detail below.

A. Generating and Providing a Mosaic Video Stream

In example embodiments, one or more mosaic video streams may be generated and/or provided. For example, one or more mosaic video streams may be provided via a CDN 90 by a streaming server 60, and/or the like. The CDN 90 may provide the one or more mosaic video streams to one or more user computing entities 80. In an example embodiment, the one or more mosaic video streams may allow a user interface of the user computing entity 80 to display a point of view of each participant or player in the esports competition, video game, and/or the like occurring within the virtual or digital environment without requiring the user computing entity 80 to receive and/or download a video stream for each participant or player. For example, if an esports competition has ten participants, a user computing entity 80 would need to receive and/or download at least ten video streams to be able to display the actions occurring within the virtual or digital environment from each of the participants' point of view. However, this would require a large amount of bandwidth (and likely more bandwidth available to the user computing entity 80) and processing resources. Therefore, the one or more mosaic video streams allow the user computing entity 80 to be able to display the actions occurring within the virtual or digital environment from each of the participants' point of view while greatly reducing the bandwidth required.

FIG. 5 provides a flowchart illustrating example processes and procedures for generating and providing a mosaic video stream, according to an example embodiment of the present invention. Starting at block 502, player or participant input is received at the primary and/or relay game server 10, 20. For example, a player or participant (e.g., operating a player computing entity and/or input device 5 (e.g., 5A, . . . , 5N) may provide player and/or participant input. The player and/or participant input may be received by the primary and/or relay game server 10, 20. The player and/or participant input may cause one or more actions to occur within the virtual or digital environment. For example, the game and/or relay game server 10, 20 may process the player and/or participant input and, in response thereto, cause one or more actions and/or events to occur within the virtual and/or digital environment.

At block 504, the primary and/or relay game server 10, 20 may provide a plurality of single point of view video streams. For example, each single point of view video stream may comprise video information/data of a particular point of view within the virtual or digital environment and audio information/data corresponding to the particular point of view within the virtual or digital environment. In an example embodiment, a point of view within the virtual or digital environment may be the point of view of a player or participant, a map of the virtual or digital environment, an observer point of view within the virtual or digital environment, the point of view from a particular location within the virtual or digital environment, and/or the like. The plurality of single point of view video streams may be received by a rendering computing entity 42. For example, a rendering computing entity 42 may receive a single point of view video stream. In an example embodiment, each rendering computing entity 42 may receive one of the single point of view video streams. In an example embodiment, the rendering computing entity 42 may be in wired or wireless communication with the primary and/or relay game server 10, 20 to facilitate the receiving of the single point of view video stream.

At block 506, each single point of view video stream is rendered by the corresponding rendering computing entity 42. For example, a rendering computing entity 42 may adjust and/or modify one or more rendering parameters (e.g., contrast, color balance, saturation, orientation, scaling, and/or the like), one or more audio parameters (e.g., volume, audio level, and/or the like), and/or the like. In an example embodiment, the rendering computing entity 42 may render the video information/data within a template and/or frame. For example, FIG. 6 illustrates an example template and/or frame 600. The frame 600 may include a video portion 602 and a point of view title 604. For example, the video information/data may be rendered within the video portion 602. The video portion 602 may be populated with the video information/data of the single point of view video stream. The point of view title 604 may indicate which point of view the single point of view video stream corresponds to. For example, if the single point of view video stream is from the point of view of Player A, the point of view title 604 may be Player A's name, player pseudonym, and/or the like. If the single point of view video stream is a map, the point of view title 604 may be "map" or indicate which part of the virtual or digital environment the map represents. If the single point of view video stream is from another point of view (e.g., an observer or a particular location), the point of view title 604 may indicate that position, observer, and/or the like. In an example embodiment, the template and/or frame 600 may comprise a border 606 within which the video portion 602 is embedded.

In an example embodiment, the one or more rendering computing entities 42 may provide the corresponding rendered single point of view video stream in a first format. For example, a rendering computing entity 42 may provide the corresponding rendered single point of view video stream as output in an HDMI format. A converter 44 may receive the rendered single point of view video stream in the first format and convert it to a second format. For example, the converter 44 may receive a rendered single point of view video stream in, for example, HDMI format, and convert the rendered single point of view video stream in, for example, SDI or HD-SDI format. In an example embodiment, the converter 44 may perform frame synchronization on the video stream. The converter 44 may then provide the rendered single point of view video stream in the second format.

Returning to FIG. 5, at block 522, the broadcaster audio information/data is generated. For example, one or more broadcasters may watch the real time or near real time action occurring within the virtual or digital environment and provide commentary thereon. For example, one or more display devices (e.g., monitors, television screens, projectors, and/or the like) may be in communication with the primary and/or relay game server 10, 20 and receive one or more single point of view video streams therefrom and provide the one or more video streams for viewing by the one or more broadcasters. One or more microphones or other audio capturing devices in communication with the broadcaster audio system 30 may capture the broadcaster commentary as broadcaster audio information/data. The captured broadcaster audio information/data may be processed, mixed, balanced, and/or the like by the broadcaster audio system 30 and provided.

At block 508, a mixer 46 receives the rendered single point of view video stream in the second format and the broadcaster audio information/data. The mixer 46 may synchronize and/or mix the audio information/data of the rendered single point of view video stream and the broadcaster audio information/data. The mixer 46 may synchronize the broadcaster audio with the audio information/data of the rendered single point of view video stream and/or the actions and/or events occurring with the virtual or digital environment. For example, the video stream may comprise environmental noise corresponding to the action occurring with the virtual or digital environment from the view point corresponding to the video stream. For example, the video stream may comprise sounds of gun shot or other environmental sounds as heard by a player, participant, or observer within the virtual or digital environment at the point of view corresponding to the video stream. In an example embodiment, the broadcaster audio may be added to the video stream such that the discussion of the broadcaster audio is aligned with the events occurring within the virtual or digital environment as seen in the visual component of the video stream and heard from the environmental sounds of the video stream. For example, if the broadcaster audio includes a comment about an individual hiding behind a rock, the comment may be aligned with the video stream such that the comment is included about the time the individual hides behind the rock and not before the individual hides behind the rock or after the individual has moved out from behind the rock. Thus, the mixer 46 may be configured to align and/or add broadcaster audio information/data to the video stream. The mixer 46 may then provide the mixed single point of view video stream. In an example embodiment, each single point of view video stream is processed by a mixer 46. For example, a mixer 46 may be dedicated to synchronizing and mixing one single point of view video stream and the broadcaster audio information/data for each single point of view video stream.

At block 510, the compository 48 receives a plurality (e.g., two or more) single point of view video streams and conducts a loudness processing procedure. For example, the compository 48 may receive the plurality of single point of view video streams and assess, measure and/or the like the loudness of the corresponding audio information/data. The compository 48 may modulate, modify, adapt, and/or the like the audio information/data of one or more of the single point of view video streams such that the volume and/or audio level of the audio information/data is consistent across each of the single point of view video streams. For example, the compository 48 may be configured to ensure that the audio levels of the plurality of video streams are consistent. For example, the compository 48 may be configured to ensure that the broadcaster audio and/or other audio is at the same audio level in each video stream. In an example embodiment, the compository 48 may be configured to ensure that none of the audio within any of the video streams surpasses a maximum audio level, and/or the like. The compository 48 may then output each single point of view video stream as an individual video stream after processing and/or adapting, modifying, modulating, and/or the like the audio information/data thereof.

At block 512, one or more mosaic video streams may be generated based on at least two of the plurality of single point of view video streams. For example, an e-sport competition may comprise two teams each having five players and the corresponding single point of view video streams may comprise one single point of view video stream for each player (e.g., amounting to ten video streams) and a map.

Thus, eleven single point of view video streams may be generated corresponding to the esports competition occurring within the virtual or digital environment. A first set of the single point of view video streams may be provided to a first multiviewer 50 via a wired or wireless connection with the compository 48 (e.g., an SDI or HD-SDI cable form an output of the compository 48 to the input 302 of the first multiviewer 50) and a second set of single point of view video streams may be provided to a second multiviewer 50 in a similar manner. For example, the first set of single point of view video streams may consist of the single point of view video streams corresponding to the players of the first team in the esports competition and the map and the second set of single point of view video streams may consist of the single point of view video streams corresponding to the players of the second team in the esports competition and the map. The first multiviewer 50 may generate a first mosaic video stream from the first set of single point of view video streams and the second multiviewer 50 may generate a second mosaic video stream from the second set of single point of view video streams.

In an example embodiment, the first mosaic video stream comprises mosaic video information/data and mosaic audio information/data. The first mosaic video stream may further comprise metadata corresponding to the mosaic video stream, one or more tags comprising metadata corresponding to the mosaic video stream, one or more of the single point of view video streams of the first set of single point of view video streams, and/or the like. In an example embodiment, the mosaic video information/data comprises at least a portion of the video information/data of each of the first set of single point of view video streams. In an example embodiment, the mosaic video information/data comprises a compressed or reduced version of the video information/data of each of the first set of single point of view video streams. In an example embodiment, the mosaic video information/data comprises a full or complete version of the video information/data (e.g., all of the video information/data in a non-compressed format) of each of the first set of single point of view video streams. In an example embodiment, the mosaic video information/data comprises mosaic audio information/data that comprises only the broadcaster audio extracted from one or more of the single point of view video streams of the first set of single point of view video streams. In an example embodiment, the mosaic audio information/data comprises audio information/data from only one of the single point of view video streams of the first set of single point of view video streams. In an example embodiment, the audio information/data from one or more (e.g., each) of the single point of view video streams in the first set of single point of view video streams is mixed, combined, and/or the like to generate the mosaic audio information/data. Thus, a multiviewer 50 may receive a set comprising two or more single point of view video streams corresponding each corresponding to a particular point of view within a virtual or digital environment and generate a mosaic video stream based thereon. The multiviewer 50 may then provide the mosaic video stream 50 to a streaming server 60.

FIG. 7 illustrates an example user interface view of a displayed version of a mosaic video stream. For example, FIG. 7 provides a schematic view 610 of how the mosaic video information/data of a mosaic video stream may be displayed by a user interface. The example schematic view 610 corresponds to an example embodiment in which a mosaic video stream is generated based on six single point of view video streams. For example, the video information/data 602A corresponding to a first single point of view video stream may be displayed within the corresponding template and/or frame 600A, the video information/data 602B corresponding to a second single point of view video stream may be displayed within the corresponding template and/or frame 600B, the video information/data 602C corresponding to a third single point of view video stream may be displayed within the corresponding template and/or frame 600C, the video information/data 602D corresponding to a fourth single point of view video stream may be displayed within the corresponding template and/or frame 600D, the video information/data 602E corresponding to a fifth single point of view video stream may be displayed within the corresponding template and/or frame 600E, and the video information/data 602F corresponding to a sixth single point of view video stream may be displayed within the corresponding template and/or frame 600F.

Continuing with FIG. 5, at block 514, the one or more mosaic video streams are provided to a streaming server 60 and the streaming server 60 provides the one or more mosaic video streams via a CDN 90. For example, the streaming server 60 may receive one or more mosaic video streams and/or one or more single point of view video streams. The streaming server 60 may encode, tag, compress, packetize, and/or the like the one or more mosaic video streams and/or one or more single point of view video streams. The streaming server 60 may then provide the one or more mosaic video streams and/or the one or more single point of view video streams to one or more CDNs 90 for provision of the video stream(s) to one or more user computing entities 80.

B. Generating and Providing Game Information/Data

In an example embodiment, the user interface may be configured to provide, display, or the like one or more statistic and/or other game information/data corresponding to the action and/or events occurring within the virtual or digital environment. FIG. 8 provides a flowchart illustrating example processes and procedures for generating and providing game information/data. Starting at block 802, player or participant input is received at the primary and/or relay game server 10, 20. For example, a player or participant (e.g., operating a player computing entity and/or input device 5 (e.g., 5A, . . . , 5N) may provide player and/or participant input. The player and/or participant input may be received by the primary and/or relay game server 10, 20. The player and/or participant input may cause one or more actions to occur within the virtual or digital environment. For example, the game and/or relay game server 10, 20 may process the player and/or participant input and, in response thereto, cause one or more actions and/or events to occur within the virtual and/or digital environment. The action and/or events occurring within the virtual or digital environment may affect one or more statistics corresponding to one or more players, participants and/or teams thereof, one or more elements of the virtual or digital environment and/or the like. For example, if a player provides input causing a bullet to be shot in the virtual or digital environment that hits a buffalo, the statistics corresponding to the player may be updated to indicate that the player has one less bullet and 200 pounds more of buffalo meat compared to before the player provided the input causing the bullet to be shot in the virtual or digital environment. The various statistics corresponding to the players, participants, and/or teams of the esports competition, video game, and/or the like occurring within the virtual or digital environment and/or corresponding to the virtual or digital environment itself may comprise the game information/data.

At block 804, the game information/data is received by the game information/data server 70. For example, the primary and/or relay game server 10, 20 may provide the game information/data. For example, the game information/data server 70 may receive the game information/data via an application programming interface (API) configured and/or programmed to interface with the primary and/or relay game server 10, 20. For example, the API may be configured and/or programmed to repeatedly and/or constantly query the primary and/or relay game server 10, 20 for updates to one or more statistics corresponding to a player, participant, team, and/or the virtual or digital environment. The game information/data server 70 may then receive the game information/data.

At block 806, the game information/data is processed and package by the game information/data server 70. For example, the game information/data server 70 may processes the game information/data to associate metadata linking one or more statistics to particular players, teams, and/or the like; to perform one or more analyses of the game information/data; generate one or more graphical representations of the game information/data; and/or the like. The game information/data server 70 may then package the processed game information/data for provision to one or more user computing entities 80. For example, the processed game information/data may be organized based on the corresponding team, player, and/or other category; packetized based on the transmission protocol to be used to provide the game information/data; and/or the like.

At block 808, the game information/data is provided to one or more user computing entities 80. For example, the game information/data server 70 may provide (e.g., transmit) the packetized game information/data. A user computing entity 80 may then receive the packetized game information/data, for example, via the network 95 and/or CDN 90.

C. Providing a User Interface for Displaying a Mosaic Video Stream

In various embodiments, a user computing entity 80 operates an application resident thereon for providing a user interface and/or accesses a user interface via an online portal, website and/or the like. The user interface configured and/or programmed to display one or more mosaic video streams. The user interface may be further configured and/or programmed to display one or more single point of view video streams, game information/data, and/or the like. In various example embodiments, the user interface may be an html, flash, and/or other user interface.

FIG. 9 provides an example view of an example user interface 650. In an example embodiment, the user interface 650 comprises one or more video stream portions 620 (e.g., 620A, 620B, 620C, 620D). Each video stream portion 620 may be configured to have a mosaic video stream or a single point of view video stream displayed thereon. For example, each video stream portion 620 may be populated by video information/data of a mosaic video stream or a single point of view video stream. For example, the mosaic video information/data of a first mosaic video stream 610A may be displayed in a first video stream portion 620A and the mosaic video information/data of a second mosaic video stream 610B may be displayed in a third video stream portion 620C. For example, the video information/data a first single point of view video stream may be displayed in a second video stream portion 620B and a second single point of view video stream may be displayed in a fourth video stream portion 620D. In an example embodiment, the user interface 650 comprises one or more video stream selectors 625 (e.g., 625A, 625B, 625C, 625D). The video stream selectors 625 may be used to receive user input selecting a video stream to be displayed in each of the one or more video stream portions. For example, user input selecting a particular video stream from a list of available video streams may be received by the user computing entity 80 by a user interacting (e.g., via an input device of the user computing entity 80) with a video stream selector 625. As should be understood, the user interface 650 may provide various functionality for a user (e.g., operating a user computing entity 80) to customize the video streams provided and/or displayed via the user interface 650.

The user interface 650 may further comprise a game information/data portion 640. The game information/data portion 640 may comprise a portion for displaying game information/data. In an example embodiment, the game information/data portion 640 comprises game information/data selection elements that may allow a user to provide user input (e.g., via an input device of the user computing entity 80) selecting one or more players for which the viewer would like to have corresponding game information/data displayed. For example, a viewer may select a Team A player and a Team B player for which corresponding game information/data may be displayed or a viewer may select to view team statistics in the game information/data portion 640. As should be understood, the user interface 650 may provide various functionality for a user (e.g., operating a user computing entity 80) to customize the game information/data provided and/or displayed via the game information/data portion 640.

FIG. 10 provides a flowchart illustrating processes, procedures, and/or operations for providing and/or displaying the user interface 650. Starting at block 1002, game information/data is received and processed. For example, the user computing entity 80 may receive game information/data and process the same. For example, an application operating on the user computing entity 80 may process the received game information/data. In response to processing the received game information/data, the user interface may display at least a portion of the received game information/data at block 1004. For example, the application operating on the user computing entity 80 and/or accessed via an online portal, website, or the like may cause a display device 216 of the user computing entity 80 to display a user interface 650 comprising a game information/data portion 640. In response to processing the received game information/data, the application may cause the game information/data portion 640 of the user interface 650 to be populated with at least a portion of the received game information/data. In an example embodiment, the game information/data displayed via the user interface 650 may be displayed in real time or near real time with respect to the action and/or events occurring within the virtual or digital environment.

At block 1006, user input selecting one or more video streams may be received. For example, a user operating a user computing entity 80 may provide input selecting one or more video streams (e.g., from a drop down menu of available video streams). The one or more video streams may comprise one or more mosaic video streams and/or one or more single point of view video streams. For example, the user interface 650 may comprise one or more video stream selectors 625 configured and/or programmed for user interaction therewith to select one or more video streams for display via the video stream portion(s) 620 of the user interface 650. In one embodiment, the user computing entity 80 may receive user input (e.g., via user interaction via an input device of the user computing entity with the user interface 650) selecting one or more video streams that the user desires to have displayed via the video stream portion(s) 620 of the user interface 650.

At block 1008, the user computing entity 80 receives the one or more user-selected video streams. For example, the user computing entity 80 may request and/or receive one or more user-selected video streams from a streaming server 60, CDN 90, and/or the like. In an example embodiment, at least one of the received video streams is a mosaic video stream. In an example embodiment, one of the received video streams is a single point of view video stream. In an example embodiment, the user computing entity 80 may process the received video streams. For example, the user computing entity 80 may process metadata associated with the video stream, tags embedded within the video stream, and/or the like.

At block 1010, in response to the processing of the received user-selected video streams, the video information/data of the received user-selected video streams is displayed via the corresponding video stream portions 620 of the user interface 650. For example, the user computing entity 80, in response to processing the received user-selected video streams, cause display of the video information/data via the user interface 650. In an example embodiment, the audio information/data of one or more of the received user-selected video streams may be provided through, for example, speakers of user computing entity 80. As will be recognized, the speakers may be integrated speakers or speakers connected to the user computing entity 80 via a wired or wireless communication format (e.g., via a headphone cable, via Bluetooth, and/or the like).

In an example embodiment, at least one of the received user-selected video streams is a mosaic video stream. Thus, the user interface 650 may display the mosaic video information/data of a mosaic video stream via the user interface 650. In an example embodiment, the mosaic audio information of the mosaic video stream may be provided via the speakers. As should be understood from the above, the mosaic video stream comprises mosaic video information/data and mosaic audio information/data. The mosaic video information/data comprises video from a plurality (e.g., two or more) points of view within a virtual or digital environment. In an example embodiment, the user interface may be configured to provide video information/data from the point of view of each player or participant of the esports competition or video game being played within the virtual or digital environment while only requiring a modest and/or practical amount of bandwidth for receiving the video streams for display via the user interface. In various example embodiments, this improvement is provided through the unconventional and/or unintended use of the multiviewer 50 to generate the mosaic video stream from a set of two or more single point of view video streams.

Various example embodiments provide an improvement to user interfaces for viewing multiple video streams and/or esports competitions and/or the like. Various example embodiments provide an improvement to the providing and/or transmitting of video streams for viewing via a user interface. In particular, by combining multiple video streams into a mosaic video stream, various example embodiments allow for efficient transmission of multiple video streams. For example, the mosaic video stream allows a user to view video streams captured from multiple points of view within a virtual or digital environment while only requiring a moderate amount of bandwidth. For example, the mosaic video stream of various example embodiments allows for efficient use of bandwidth while allowing a user to view multiple video streams simultaneously.

V. Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A system comprising:
   a plurality of stream processing systems in communication with one or more game servers generating digital environment, each stream processing system configured to process an audio-visual stream captured from a corresponding point of view within the digital environment;
   a multiviewer; and
   a streaming server;
   wherein the multiviewer is configured to:
      receive a plurality of single view audio-visual streams processed by the plurality of stream processing systems, each of the plurality of single view audio-visual streams captured at a corresponding point of view within the digital environment,
      de-embed the audio stream from each of the single view audio-visual streams to generate a plurality of visual streams and a plurality of audio streams,
      generate a single combined audio stream based at least in part on at least one of the plurality of audio streams,
      generate a single visual stream based on two or more of the plurality of visual streams,
      combine the single visual stream and the single combined audio stream into a single mosaic video stream corresponding to a plurality of points of view within the digital environment, wherein the single mosaic video stream comprises a single set of audio information, and
      provide the mosaic video stream to the streaming server for streaming to at least one user computing entity.

2. The system of claim 1, wherein the one or more game servers are in communication with one or more player computing entities or player input devices and input received from the one or more player computing entities or player input devices causes one or more events to occur within the digital environment.

3. The system of claim 1, wherein the plurality of stream processing systems are configured to process the plurality of single view audio-visual streams such that when the plurality of single view audio-visual streams are provided to the multiviewer, each of the single view audio-visual streams is temporally synchronized with each of the other single view audio-visual streams.

4. The system of claim 1 further comprising a compository, the compository configured to adjust audio levels of the one or more single view audio-visual streams such that an audio level of a first single view audio-visual stream is consistent with an audio level of a second single view audio-visual stream.

5. The system of claim 1, wherein the digital environment is an esports competition or video game.

6. The system of claim 1, wherein the combined audio-visual stream is provided to the streaming server in real time or near real time with respect to the events occurring within the digital environment.

7. The system of claim 1, further comprising a broadcaster audio system.

8. The system of claim 7, wherein at least one of the plurality of stream processing systems comprises a mixer configured to mix broadcaster audio provided by the broadcaster audio system with the audio captured from the corresponding point of view within the digital environment.

9. The system of claim 7, wherein the stream processing system comprises a mixer configured to temporally align the broadcaster audio provided by the broadcaster audio system with events with the audio captured from the corresponding point of view within the digital environment based on a timing of when the audio was captured from the corresponding point of view within the digital environment and a timing of when the broadcaster audio was captured by the broadcaster audio system.

10. The system of claim 1, wherein a stream processing system of the plurality of stream processing systems comprises a converter configured to convert the audio-visual stream provided by the one or more game servers from a first format as rendered by a rendering computing entity of the stream processing system to a second format.

11. The system of claim 10, wherein the first format is High-Definition Multimedia Interface (HDMI).

12. The system of claim 10, wherein the second format is a broadcast television format.

13. The system of claim 10, wherein the second format is high-definition serial digital interface (HD-SDI) format.

14. The system of claim 1, wherein the plurality of stream processing systems are configured to render the corresponding single view audio-visual stream into a frame.

15. The system of claim 14, wherein the frame comprises a point of view title corresponding to the point of view of the single view audio-visual stream.

16. The system of claim 15, wherein the single combined audio-visual stream comprises the frame of each of the plurality of single view audio-visual streams and the corresponding point of view title.

17. The system of claim 1, wherein the multiviewer comprises a vertical blanking interval recovery component, an audio de-embedder, and a video output formatter.

18. The system of claim 1, wherein the stream processing system comprises a rendering computing entity configured to render the corresponding single view audio-visual stream, a converter configured to convert the single view audio-visual stream from a first format received from the rendering computing entity to a second format to be provided to the multiviewer, and a mixer configured to modify the audio of the single view audio-visual stream.

\* \* \* \* \*